(12) United States Patent
Coupain et al.

(10) Patent No.: US 7,991,047 B2
(45) Date of Patent: Aug. 2, 2011

(54) METHOD FOR DESIGNING A DIGITAL RECEPTION FILTER AND CORRESPONDING RECEIVING DEVICE

(75) Inventors: Eric Coupain, Suresnes (FR); Alexandre Rouxel, Mathieu (FR)

(73) Assignee: Wavecom, Issy-Les-Moulineaux Cedex (FR)

( * ) Notice: Subject to any disclaimer, the term of this patent is extended or adjusted under 35 U.S.C. 154(b) by 951 days.

(21) Appl. No.: 11/659,242

(22) PCT Filed: Jun. 17, 2005

(86) PCT No.: PCT/FR2005/001529
§ 371 (c)(1), (2), (4) Date: Jul. 18, 2007

(87) PCT Pub. No.: WO2006/024712
PCT Pub. Date: Mar. 9, 2006

(65) Prior Publication Data
US 2007/0281640 A1 Dec. 6, 2007

(30) Foreign Application Priority Data
Aug. 2, 2004 (FR) ...................................... 04 08538

(51) Int. Cl.
*H03H 7/30* (2006.01)
*H03D 1/04* (2006.01)
*H04B 7/212* (2006.01)

(52) U.S. Cl. ........................ 375/232; 375/346; 370/442

(58) Field of Classification Search ................. 375/232, 375/346; 370/442
See application file for complete search history.

(56) References Cited

U.S. PATENT DOCUMENTS

| | | | |
|---|---|---|---|
| 6,590,932 B1 * | 7/2003 | Hui et al. | 375/232 |
| 6,674,820 B1 * | 1/2004 | Hui et al. | 375/346 |
| 7,148,845 B2 * | 12/2006 | Rooyen et al. | 342/377 |
| 7,149,255 B2 * | 12/2006 | Chenu-Tournier et al. | 375/267 |
| 2002/0141437 A1 * | 10/2002 | Meyer et al. | 370/442 |
| 2003/0198305 A1 | 10/2003 | Taylor et al. | 375/341 |
| 2004/0022335 A1 | 2/2004 | Arslan et al. | 375/346 |
| 2004/0028155 A1 * | 2/2004 | Dornstetter et al. | 375/343 |
| 2004/0104844 A1 * | 6/2004 | Rooyen et al. | 342/377 |
| 2004/0116078 A1 * | 6/2004 | Rooyen et al. | 455/101 |
| 2004/0234012 A1 * | 11/2004 | Rooyen | 375/347 |
| 2005/0031063 A1 | 2/2005 | Laot | 375/348 |

FOREIGN PATENT DOCUMENTS

| | | |
|---|---|---|
| EP | 1170916 | 1/2002 |
| GB | 2344494 A | 7/2000 |
| WO | WO 03/036893 A1 | 5/2003 |
| WO | WO 2004/008705 A1 | 1/2004 |

* cited by examiner

*Primary Examiner* — Shuwang Liu
*Assistant Examiner* — Sarah Hassan
(74) *Attorney, Agent, or Firm* — David D. Brush; Westman, Champlin & Kelly, P.A.

(57) ABSTRACT

A method is provided for designing a digital reception filter for a wanted signal. The method includes modeling at least one transmission channel of at least one signal interfering with said wanted signal in such a way that the pattern of an interfering channel is obtainable, in bleaching said at least one interfering signal by a bleaching filter taking into consideration said interfering channel pattern and a noise thereon (pattern noise) and in calculating the coefficients of said digital reception filter using at least one coefficient of the bleaching filter.

10 Claims, 8 Drawing Sheets

METHOD FOR DESIGNING A DIGITAL RECEPTION FILTER AND CORRESPONDING RECEIVING DEVICE

CROSS-REFERENCE TO RELATED APPLICATION

This Application is a Section 371 National Stage Application of International Application No. PCT/FR2005/001529, filed Jun. 17, 2005 and published as WO 2006/024712 on Mar. 9, 2006, not in English, the content of which is hereby incorporated by reference in its entirety.

FIELD OF THE DISCLOSURE

The field of the disclosure is that of radio communications, and more specifically the reception of a signal in a radio communication system.

Still more specifically, the disclosure relates to a technique for designing a filter and for filtering a main signal in the presence of interfering signals, and in particular a technique for adaptive filtering providing good reception quality with a low-complexity receiver.

The disclosure has applications in particular in GSM ("Global System for Mobile Communications"), GSM/GPRS ("General Packet Radio Service"), GSM/GPRS/EDGE ("Enhanced Data rate for GSM Evolution"), and other types of cellular radio communication systems.

BACKGROUND

Conventionally, a receiver in a cellular radio communication system includes a receiving filter making it possible to select the main channel assigned to it.

However, the presence of multiple paths between a transmitter and a receiver, or the presence of other users in the same cell, causes interfering signals, necessitating the use of a complex filtering technique at the reception.

A filtering technique based on a MMSE ("Minimum Mean Square Error") receiver has been envisaged, as shown in FIG. 1.

According to this technique of the prior art, a stationary receiving filter Rx 13 is considered. Thus, the filter Rx 13 is designed so as to comply with a certain frequency template.

More specifically, this receiving filter Rx 13 is suitable for eliminating the contribution of an additive white Gaussian noise AWGN 12 added during the transmission on the main signal x(k), the main signal being filtered by a global filter H 11 representing the different processing operations performed.

The receiving filter Rx 13 is then designed so as to minimise the decision error between the signal y(k) at the output of the filter Rx 13 and the main signal x(k) before transmission.

Thus, the MMSE receiving filter Rx 13 takes into account the global filter H 11, and is designed so as to minimise the mean square error at the output of this filter Rx 13, defined by:

$$J(H)=E[|x(k)-y(k)|^2]$$

where E[•] corresponds to the mathematical expectation.

However, a major disadvantage of this technique is that the receiving filter is not designed by taking into consideration the spectrum of signals interfering with the main signal, and does not therefore achieve the best compromise between the inter-symbol and inter-user interference.

Thus, this technique can eliminate only a limited inter-symbol interference coming from the different filters, such as the filter H 11, and does not take into account the interferences coming, for example, from other users, also called co-channel or adjacent interference.

SUMMARY

A method is proved for designing a digital reception filter of a main signal.

According to an embodiment the invention, such a method includes steps of:
- modelling at least a transmission channel for transmission of at least one signal interfering with said main signal, so as to obtain an interfering channel model;
- whitening of said at least one interfering signal, by means of a whitening filter taking into consideration said interfering channel model and a noise on said model, referred to as a model noise;
- calculating coefficients of said digital receiving filter on the basis of at least one coefficient of said whitening filter.

Thus, an embodiment of the invention is based on an entirely novel and inventive approach to the design of a receiving filter, implementing a whitening step making it possible to whiten at least one interfering signal.

Indeed, unlike the techniques of the prior art, which envisage only the whitening of an additive white noise on the main signal, an embodiment of the invention proposes also taking into account signals interfering with the main signal, and implements a robust whitening of these signals. It is noted that "robust" is intended to mean that the receiving filter constructed according to an embodiment of the invention always has good performance, even when the propagation channel of interfering signals varies.

The propagation channel corresponds here, and throughout this document, to the physical channel between a transmitter and a receiver, while the transmission channel includes the transmission filter(s), the propagation channel and the receiving filter(s).

The interfering signals are, for example, transmitted in the same frequency band as the main signal, or transmitted in a frequency band adjacent to the frequency band of the main signal, i.e. carried by propagation channels adjacent to the main signal propagation channel.

It can be noted that adjacent channel means the channel that immediately precedes (left adjacent channel) or that immediately follows (right adjacent channel) main signal propagation channel, as well as the bi-adjacent channels.

Thus, according to the design method of an embodiment of the invention, the coefficients of a receiving filter are determined by modelling the transmission channel (including, among other things, at least one transmission filter, a propagation channel and a receiving filter), and by whitening the interfering signals. The whitening of the interfering signals is implemented by a whitening filter, determined by the transmission channel and a model noise on the channel model, the model noise being a white Gaussian noise B with a power $\sigma^2$.

The transmission channel is, for example, modelled in the form of a digital global transfer filter G, defined by coefficients $g_k$, where $g_k$ is the $k^{th}$ coefficient of the filter G.

Thus, the model noise on the transmission channel model is a noise $b_k$ added to each of the coefficients $g_k$.

Then, a robust filter F of the transfer function of an interfering signal is modelled, using coefficients $f_k$: $f_k = g_k + b_k$.

The method for designing a receiving filter according to an embodiment of the invention is also remarkable in that the complexity of the digital receiving filter can be parameterised by means of the model noise.

Indeed, the power of the model noise $\sigma^2$ makes it possible to adjust the length of the whitening filter, and consequently the length of the receiving filter.

The whitening filter is advantageously a minimum-phase filter.

The modelling step preferably takes into account:
- at least one filter for transmission of said main signal and/or said at least one interfering signal;
- at least one channel for propagation of said interfering signal of which the transfer function is modelled by the identity function;
- at least one filter representing at least one radio processing operation applied to said main signal at the reception.

Thus, the channel model, for example the digital global transfer filter G, includes the filter for transmission of the interfering signal, the channel for propagation of the interfering signal, and a radio receiving filter modelling the radio processing operations.

The radio filter makes it possible to model the linear effects of the radio, and in particular the processing operations performed at the reception.

According to an embodiment of the invention, the transfer function of the propagation channel is modelled by the identity function. Thus, the transfer function of the propagation channel is defined by:

$$c_k=1 \text{ for } k=0$$

$$c_k=0 \text{ for } k\neq 0.$$

An embodiment of the invention also relates to a device for receiving a main signal carried in a main propagation channel, and transmitted in a desired frequency band.

According to an embodiment of the invention, such a device has a series filtering architecture making it possible at least partially to eliminate the contribution of at least one disturbance affecting the main signal, and includes:
- at least one first filter $Rx_1$ suitable for the disturbances belonging to the group including:
  - at least one interfering signal transmitted in said desired frequency band, called the co-channel interfering signal;
  - at least one thermal white noise;
- at least one second filter $Rx_2$ suitable for at least one interfering signal transmitted in a frequency band different from said desired frequency band, and in particular in a frequency band adjacent to said desired frequency band, called an adjacent interfering signal.

It is noted that, throughout the description, "adjacent interfering signal" is used to refer to bi-adjacent interfering signals, and that the main propagation channel corresponds to the channel for propagation of the main signal.

A co-channel interfering signal is therefore transmitted in the same frequency band as the main signal.

Thus, such a receiving device includes at least two receiving filters in series, each of the filters being suitable for at least partially eliminating the contribution of a type of disturbance (for example, a white noise, a co-channel interfering signal, an adjacent interfering signal, and so on).

The second filter $Rx_2$ can in particular be optimised according to the first filter $Rx_1$, i.e. the coefficients of the second filter $Rx_2$ are determined by taking into account the first filter $Rx_1$.

According to a preferred embodiment of the invention, the first filter $Rx_1$ is implemented with hardware, i.e. by means of electronic components, while the second filter $Rx_2$ is implemented with software, i.e. in software form.

The receiving device advantageously also includes means for detecting at least one adjacent interfering signal determining the activation of the second filter $Rx_2$.

Thus, the second filter $Rx_2$ is activated only when at least one adjacent interfering signal is detected by the detection means.

These detection means are, for example, placed between the first filter $Rx_1$ and the second filter $Rx_2$. If they do not detect adjacent interfering signals, the resources used to implement the second filter $Rx_2$ are available and can be used to implement a multi-user detection method.

The receiving device is preferably of the linear MMSE type ("Minimum Mean Square Error").

According to an advantageous embodiment of the invention, the coefficients of at least one of the first and second filters are a function of the coefficients of a filter for whitening at least one co-channel and/or adjacent interfering signal, said whitening filter taking into account a noise on a model of a channel for transmission of said interfering signal, called the model noise.

Thus, at least one of the filters used in the receiving device can be designed by using the method for designing a receiving filter as described above.

The receiving device thus obtained is simple to implement and has improved performance with respect to the systems of the prior art, in particular in the presence of interfering signals.

According to this advantageous embodiment of the invention, for the first filter $Rx_1$, enabling at least one co-channel interfering signal and/or white noise to be filtered, the transmission channel model takes into account:
- a filter Tx for transmission of said main signal and/or said at least one co-channel interfering signal;
- at least one channel for propagation of said co-channel interfering signal of which the transfer function is modelled by the identity function;
- at least one filter representing at least one radio processing operation applied to said main signal at the reception.

As the co-channel interfering signals are transmitted in the same frequency band as the main signal, called the desired frequency band, the transmission filter Tx is considered to be similar for the main signal and for the co-channel interfering signals.

For the second filter $Rx_2$, enabling at least one adjacent interfering signal to be filtered, the transmission channel model takes into account:
- a filter Tx for transmission of said main signal;
- at least one filter $J_2$ for transmission of said adjacent interfering signals;
- at least one channel for propagation of said adjacent interfering signals of which the transfer function is modelled by the identity function;
- at least one filter representing at least one radio processing operation applied to said main signal at the reception;
- said first filter $Rx_1$.

In this case, it is considered that the filter $J_2$ for transmission of said adjacent interfering signals is modelled by the filter Tx for transmission of the main signal modulated by a sinusoid at a frequency of 200 kHz for the adjacent signals, 400 kHz for the bi-adjacent signals, and so on, with the radio communication system considered being of the GSM/GPRS/EDGE type.

Of course, these frequency bands can be different in other radio communication systems.

It is also noted that the second filter $Rx_2$ is designed as a function of the coefficients of the first filter $Rx_1$.

Thus a second filter $Rx_2$ is designed, which is optimised in order to eliminate the contribution of the adjacent interfering signals on a main signal already filtered by a first filter $Rx_1$ making it possible to at least partially suppress the co-channel interfering signals and the thermal white noise, and limiting the inter-symbol interference.

BRIEF DESCRIPTION OF THE DRAWINGS

Other features and advantages will become clearer on reading the following description of a preferred embodiment, given by way of a simple illustrative and non-limiting example, and the appended drawings, in which.

DETAILED DESCRIPTION OF ILLUSTRATIVE EMBODIMENTS

The general principle of an embodiment of the invention is based on the implementation of a whitening step during the design of a receiving filter, making it possible to whiten the inter-symbol interference coming from different filters (in particular a transmission filter generally not satisfying the Nyquist criterion), and multi-user interference, by means of a whitening filter taking into account a model noise on a modelling of the transmission channel.

Figure 2A:
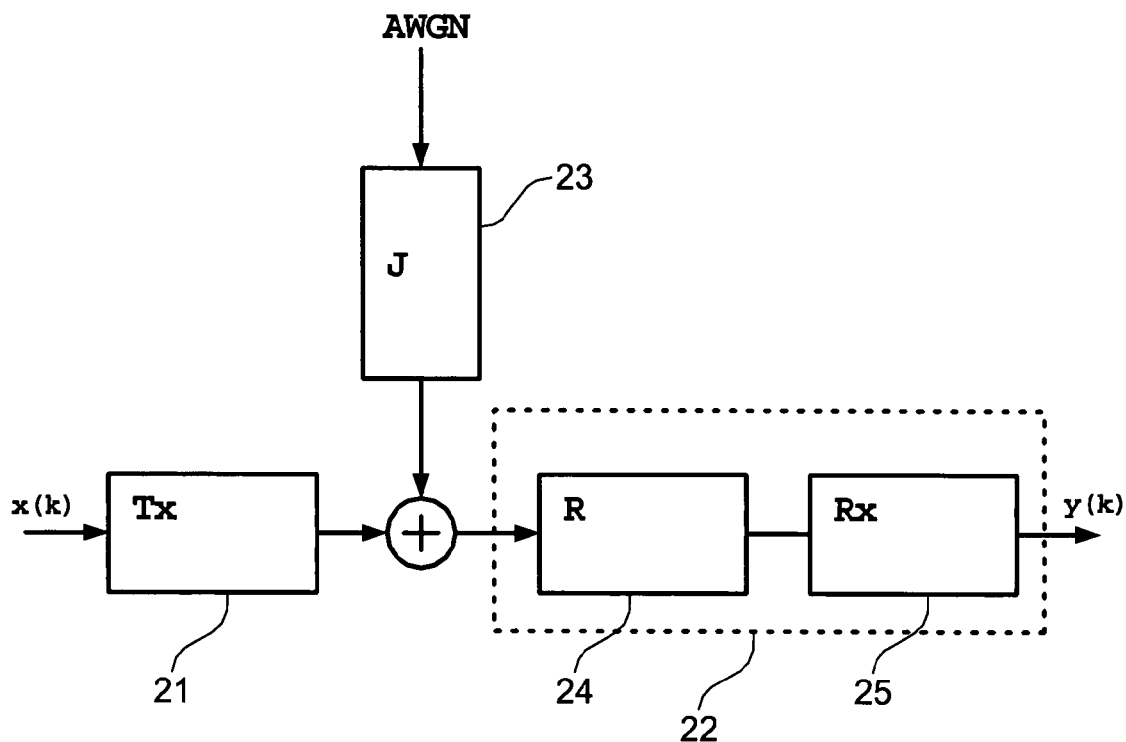
FIGS. 2A and 2B show the general principle for designing a receiving filter in the presence of interfering signals according to an embodiment of the invention.
Figure 2B:
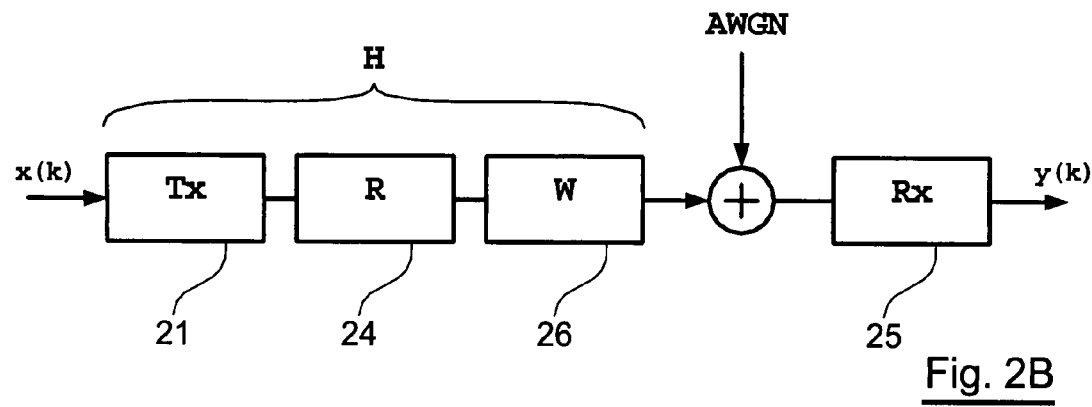

An embodiment of the invention also proposes a series arrangement of receiving filters in a receiver, each of the receiving filters being, for example, designed using a whitening filter suitable for whitening distinct interfering signals.
1. General Principle of the Design of a Receiving Filter in the Presence of Interfering Signals:

The general principle of the design of a receiving filter in the presence of interfering signals is presented in relation to FIGS. 2A and 2B.

It is assumed, in this example, and in the remainder of this document, that the transfer function of the channel for propagation of interfering signals, i.e. multi-paths, is equal to 1.

To determine the coefficients of the receiving filter according to an embodiment of the invention, we will consider a transmission channel composed of at least one transmission filter for transmission of the main signal and/or interfering signals, at least one propagation channel for propagation of the main signal and/or interfering signals, and at least one receiving filter.

We thus consider a main signal, filtered by a transmission filter Tx 21 before transmission.

The main signal at the output of the transmission filter Tx 21, transmitted in a desired frequency band, then has a certain distortion, due to the aliasing phenomenon, and therefore has inter-symbol interference.

We then consider that the transmitted signal is carried in a main propagation channel before being received in a receiving device 22.

During the propagation, interfering signals can be added to the main signal. These different interfering signals are modelled by means of a filter J 23 for shaping interfering signals, and carried by a channel for propagation of interfering signals having a transfer function equal to the identity.

The signal considered to be received at the receiving device 22 is therefore composed of the transmitted signal and a non-white noise.

The signal received is then filtered by a radio filter R 24 making it possible to model the linear effects of the radio, and in particular the processing operations performed at the reception.

Thus, the transmission channel is, for example, modelled in the form of a digital global transfer filter G, defined by coefficients $g_k$, where $g_k$ is the $k^{th}$ coefficient of the filter G, such that:

$$G(z)=R(z) \cdot J(z),$$

with J(z) the z-transform of the shaping filter J 23;

R(z) the z-transform of the radio filter R 24.

According to an embodiment of the invention, a robust filter F (defined by coefficients $f_k$) is modelled from the digital global transfer filter G, by considering a white Gaussian model noise B of power $\sigma^2$ on the coefficients of the global transfer filter G:

$$f_k = g_k + b_k.$$

An embodiment of the invention then proposes calculating the coefficients of the receiving filter Rx 25 from the modelling of a whitening filter.

Thus, as shown in FIG. 2B, a whitening filter W 26 is modelled, from the robust filter F. The interfering signal, considered to be a non-white noise at the output of the radio filter R 24, is then whitened by the whitening filter W 26.

This robust whitening filter W 26 therefore takes into account a model of the transmission channel and a model noise on said model, with the modelling of the transmission channel taking into account the transmission filter Tx 21 of the main signal, the filter J 23 for shaping interfering signals, the channel for propagating interfering signals and the radio filter R 24.

The model noise introduced in the model of the transmission channel leads to an imperfect modelling of the whitening filter W 26, i.e. the zero frequencies of the spectrum of the digital global transfer filter G are not exactly compensated by the whitening filter W 26 and filter W is still of finite length.

The power $\sigma^2$ of the model noise makes it possible in particular to adjust the length of the whitening filter W 26, and therefore the length of the receiving filter Rx 25.

Similarly, the robustness of the receiving filter Rx 25 is also increased, with respect to the channel for propagation of interfering signals, when faced with an approximately-modelled interfering signal.

At the output of the modelled whitening filter W 26, the non-white interfering signal from the filters for transmission Tx 21, shaping J 23 and radio modelling R 24, is therefore again white, which makes it possible to design a receiving filter Rx 25 of reduced complexity.

Thus, according to an embodiment of the invention, when the additive noise is not white, a receiving filter Rx 25 is designed based on the modelling of a whitening filter W 26 that is robust with respect to the modelling of the channel for transmission of interfering signals.

Figure 1:
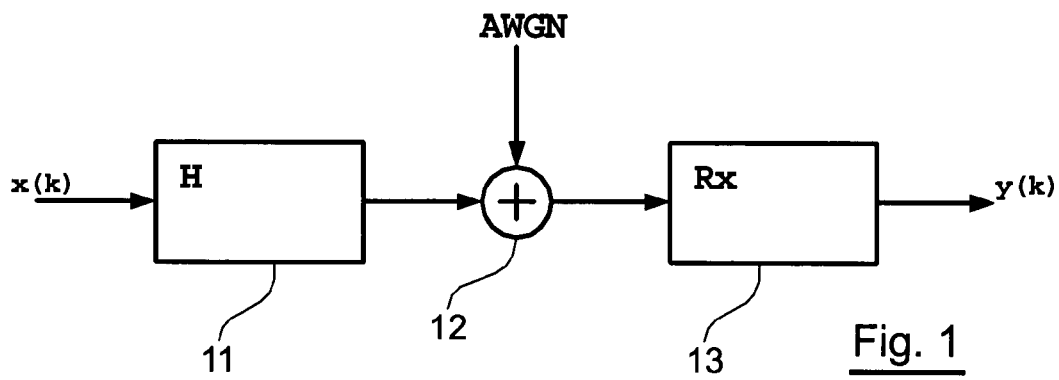
FIG. 1, already described in reference to the prior art, shows a filtering technique based on an MMSE receiving filter.

The interfering signal entering the receiving filter Rx 25 of the receiving device 22 is then considered to be a white noise, and the coefficients of the receiving filter Rx 25 are determined so as to minimise the mean square error, as shown in reference to the prior art shown in FIG. 1.

Thus, the receiving filter Rx 25 can be considered to be a linear equaliser of reduced complexity, based on a MMSE criterion.

It is thus possible to construct an optimal receiving filter Rx 25 of finite length, taking into account the filter for whitening interfering signals, and robust with respect to the interfering signals.

The receiving filter then achieves a compromise between the minimisation of the inter-symbol interference, due to the different filters, in particular the transmission filter (not satisfying the Nyquist criterion), and the minimisation of the inter-user interference, due to the other users.

The approach proposed for the design of the receiving filter Rx 25 therefore involves constructing a MMSE linear equaliser suitable both for the transmission filter Tx 21 convoluted by the radio model represented by the radio filter R, and for the whitening filter W 26.

More specifically, it is possible to define the whitening filter W 26 on the basis of the following equations:

$$W(z) \cdot W^*(1/z^*) = \frac{1}{F(z) \cdot F^*(1/z)} = \frac{1}{G(z) \cdot G^*(1/z^*) + \sigma^2}$$

with $G(z) = J(z) \cdot R(z)$ where
$G(z) \cdot G^*(1/z^*)$ is the bilateral z-transform of the correlation of the global transfer filter G;
$F(z) \cdot F^*(1/z^*)$ is the bilateral z-transform of the correlation of the robust filter F;
$J(z)$ is the z-transform of the shaping filter J;
$R(z)$ is the z-transform of the radio filter R;
$\sigma^2$ is the power of the model noise, or its variance.

This robust whitening filter W 26 is defined by its unilateral z-transform W(z), and calculated so as to whiten the correlation of the robust filter F.

If F(z) is a filter of length L, there are $2^L$ ways to construct the whitening filter W 26.

We propose to use a minimum-phase filter to facilitate the truncation of the receiving filter Rx 25.

The model noise $\sigma^2$ determines the power of the noise taken into account in the whitening step, and makes it possible to adjust the length of the filter W 26. The adjustment of this model noise thus makes it possible to prevent F(z) from having a root on the unit circle, and therefore to prevent the filter W 26 from becoming infinitely long.

Thus, the "gaps" in frequencies are not exactly compensated by the whitening filter W 26 and it remains of finite length. The robustness of the design filter Rx 25 is also increased with respect to a poorly modelled interfering signal.

The receiving filter Rx 25 is then constructed as a MMSE linear equaliser, by implementing a conventional technique for minimising the mean square error as shown in relation to FIG. 1, and by considering that the global filter H 11 representing the different processing operations performed corresponds to the convolution of the filters for transmission Tx 21, radio R 24 and whitening W 26:

$$H(z) = Tx(z) \cdot R(z) \cdot W(z),$$

$$J(H) = E[|x(k) - y(k)|^2],$$

where $E[\bullet]$ corresponds to the mathematical expectation.

Thus, the MMSE receiving filter Rx 25 takes into account the global filter H 11, and is designed so as to minimise the mean square error J.

The introduction of this factor $\sigma^2$ into the whitening step can also be seen as a whitening in the MS sense, considering a non-zero background noise.

2. Application to Co-Channel and Adjacent Interferences in the Context of a Series Filtering Architecture:

It is also possible to construct one or more receiving filters suitable for distinct interfering signals so as to design a receiving device of reduced complexity, having good performance in the presence of interfering signals of different types.

This receiving device can in particular have a series filtering architecture, including at least two filters in series, each suitable for eliminating the contribution of at least one disturbance affecting the main signal.

Figure 3:
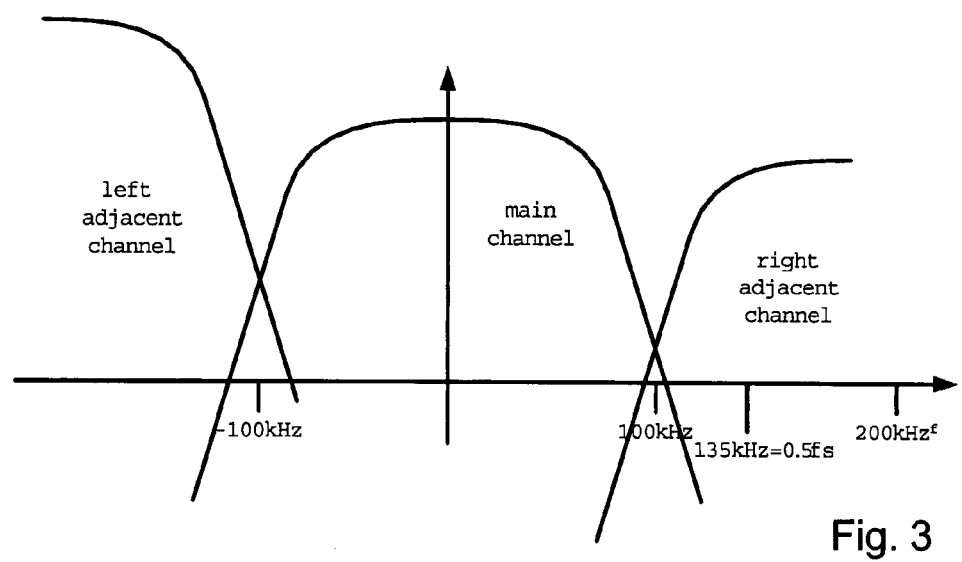
FIG. 3 shows the configuration of channels in a radio communication system of the GSM/GPRS/EDGE type.

Indeed, in a cellular radio communication system, different types of disturbances are encountered:
adjacent interfering signals, transmitted in a frequency band different from the desired frequency band, or carried by at least one propagation channel adjacent to said main propagation channel, as shown in FIG. 3;
co-channel interfering signals, transmitted in the same frequency band as the main signal, and coming in particular from different filters;
thermal white noise.

According to an embodiment of the invention, it is proposed to use a series filtering system based on the factorization of the propagation cases. Thus, the "noise" or "interference" disturbances are classified into two groups:
1. the co-channel interfering signals and the thermal white noise;
2. the adjacent interfering signals.

Figure 4:
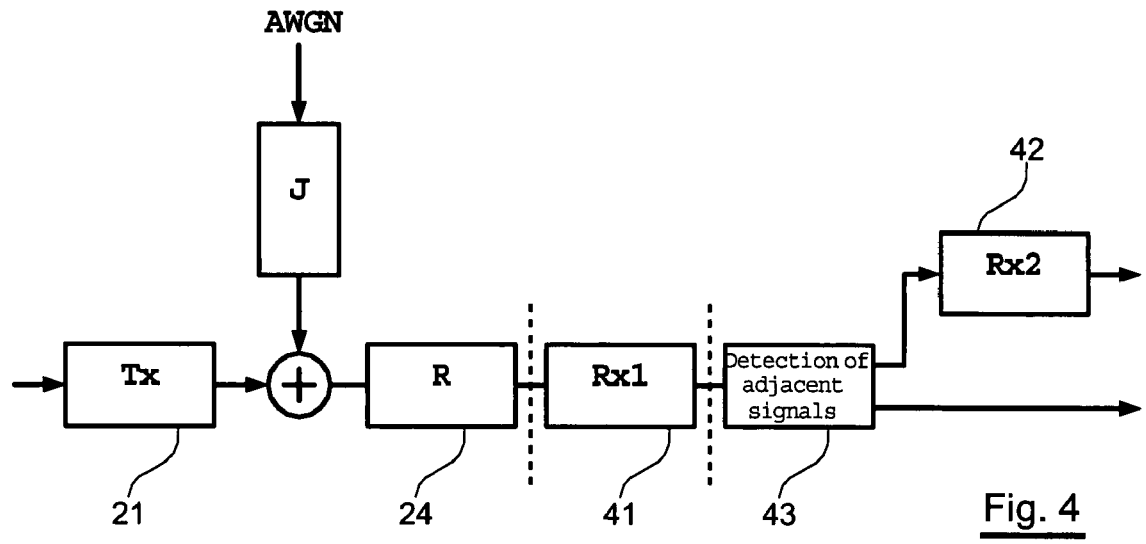
FIG. 4 shows the series arrangement of two receiving filters designed according to the general principle of FIGS. 2A and 2B.

Thus, as shown in FIG. 4, the receiving device takes into account a first filter $Rx_1$ 41 designed to optimise the performance of the receiver in the presence of co-channel interfering signals and/or thermal white noise, and a second filter $Rx_2$ 42 designed to optimise the performance of the receiver in the presence of adjacent interfering signals, arranged in series.

According to a preferred embodiment of this device based on a series filtering technique, means 43 for detecting adjacent interfering signals are inserted before the second filter $Rx_2$ 42. Thus, the receiving device performs a filtering operation by means of the second filter $Rx_2$ 42 depending on the detection of adjacent interfering signals.

The first receiving filter $Rx_1$ 41 is preferably implemented with hardware, i.e. using electronic components, while the second filter $Rx_2$ is implemented with software, i.e. in software form.

Thus, when the adjacent detection means 43 do not detect adjacent interfering signals, the resources normally used by the second receiving filter $Rx_2$ 42 remain available.

It is therefore possible to envisage using the available calculation resources, in the absence of adjacent interfering signals, by the first receiving filter $Rx_1$ 41 in order to implement a method for joint detection of co-channel interfering signals, i.e. multi-users.

It is also possible, when the interfering signals vary, to adjust the coefficients of the second receiving filter $Rx_2$ 42 in order to improve the performance of the receiving device.

These two receiving filters $Rx_1$ 41 and $Rx_2$ 42 are, according to a preferred embodiment, designed according to the method for designing a receiving filter of an embodiment of the invention.

According to other alternative embodiments, these receiving filters $Rx_1$ 41 and $Rx_2$ 42 are designed according to another technique.

According to the preferred embodiment in which the receiving filters $Rx_1$ 41 and $Rx_2$ 42 are designed according to the design method of an embodiment of the invention, the different co-channel and adjacent interfering signals are modelled by means of a filter for shaping interfering signals, with the same template as the transmission filter Tx 21.

Figure 5A:
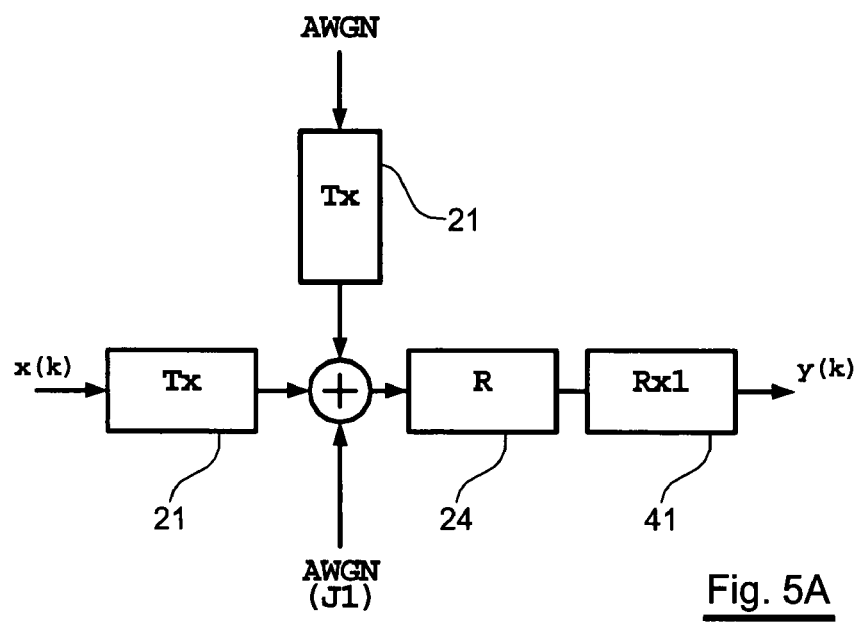
FIGS. 5A and 5B show the receiving filter design technique of FIGS. 2A and 2B in the presence of co-channel interfering signals and thermal white noise.

Thus, in the case of co-channel interfering signals, as shown in FIG. 5A, the filter $J_1$ for shaping interfering signals is considered to be equivalent to the filter Tx 21 for transmitting wanted and/or interfering signals, to which a white noise of power $\sigma_1^2$ is added. The power of this noise can vary, and can be substantially equal to 0.

Figure 6A:
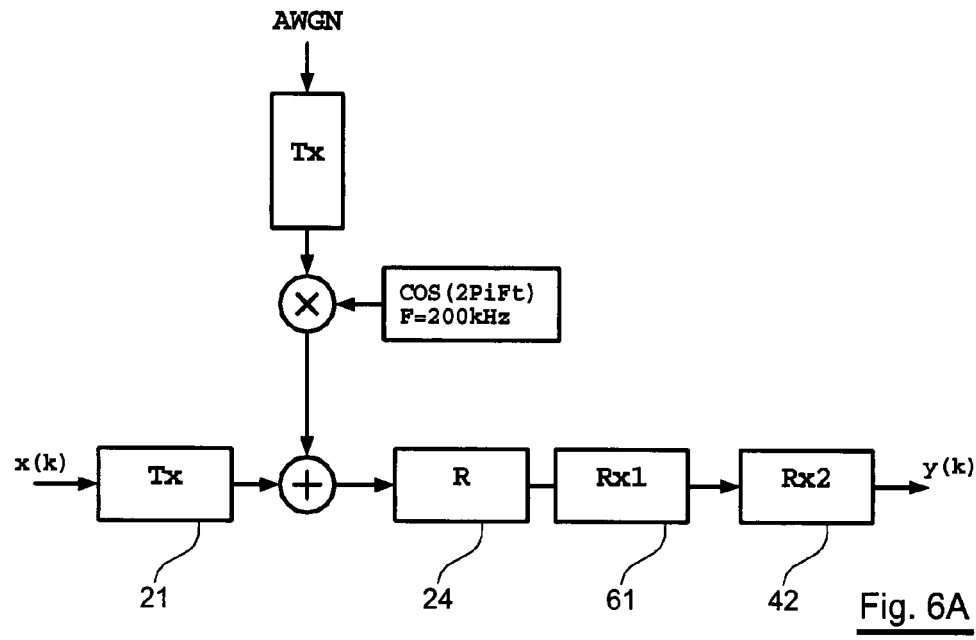
FIGS. 6A and 6B show the receiving filter design technique of FIGS. 2A and 2B in the presence of interfering signals transmitted in a frequency band adjacent to the frequency band for transmission of the main signal.

In the case of adjacent interfering signals, as shown in FIG. 6A, the filter $J_2$ for shaping interfering signals is considered to be equivalent to the transmission filter Tx 21 frequency shifted by 200 kHz, i.e. modulated by a sinusoid at a frequency of 200 kHz.

3. Optimisation of the Coefficients of the First Receiving Filter:

According to this preferred embodiment of the invention, the receiving device first optimises the calculation of the coefficients of the first receiving filter $Rx_1$, as shown in FIG. 5A.

This receiving filter $Rx_1$ is designed to optimise the performance of the receiver in the presence of co-channel-type interferences and/or an additive white noise. It thus minimises the residual inter-symbol interference seen by the receiver, and due to the transmitting and receiving filters.

Figure 5B:
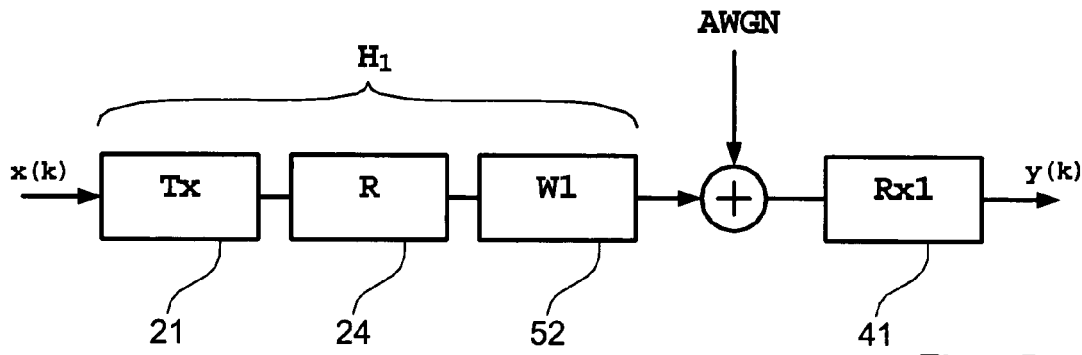

As shown in FIG. 5B and explained above in reference to FIGS. 2A and 2B, a first whitening filter $W_1$ 52 is modelled, making it possible to whiten a non-white noise (affected by the co-channel interfering signals) at the output of the radio filter R 24, so as to calculate the coefficients of the first receiving filter $Rx_1$ 41.

To do this, the transmission channel is first modelled, taking into account:
- the filter $J_1$ for shaping interfering signals;
- at least one channel for propagation of the co-channel interfering signal of which the transfer function is modelled by the identity function;
- the radio filter R representing at least one radio processing operation applied to the main signal at the reception.

The filter $J_1$ for shaping interfering signals takes into account in particular the filter for transmission Tx 21 of the main signal, since the interfering signals (co-channel interfering signals and/or white noise) are transmitted in the same frequency band as the main signal, and the white noise with a power $\sigma_1^2$:

$$J_1(z) = Tx(z) + \sigma_1$$

It is noted that the greater $\sigma_1$ is with respect to the coefficients of the filter Tx 21 for transmission of the wanted and/or interfering signals, the better the receiving filter $Rx_1$ 41 will perform for a propagation channel carrying an additive white Gaussian noise.

Conversely, the lower $\sigma_1$ is with respect to the coefficients of the filter Tx 21 for transmission of the wanted and/or interfering signals, the better the receiving filter $Rx_1$ 41 will perform in the case of an additive white Gaussian noise.

The channel model can in particular be expressed in the form of a global transfer filter $G_1$.

Next, we consider a model noise $\sigma^2$ on the coefficients of the global transfer filter $G_1$, forming a robust filter $F_1$.

This model noise $\sigma^2$ is taken into account in particular in the whitening step, in the first whitening filter $W_1$ 52, and enables the whitening of the co-channel interfering signal to be made robust with regard to the channel for propagation of the interfering signals. This model noise $\sigma^2$ also makes it possible to adjust the length of the filter $W_1$ 52, defined by the following equations:

$$W_1(z) \cdot W_1^*(1/z^*) = \frac{1}{F_1(z) \cdot F_1^*(1/z^*)} = \frac{1}{G_1(z) \cdot G_1^*(1/z^*) + \sigma^2}$$

$$\text{with } G_1(z) = R(z) \cdot J_1(z)$$

$$\text{and } J_1(z) = Tx(z) + \sigma_1$$

where
- Tx(z) is the z-transform of the filter Tx for transmission of the main signal;
- R(z) is the z-transform of the radio filter R;
- $\sigma^2$ is the power of the model noise, or its variance.

The first filter $Rx_1$ 41 is then constructed as a MMSE linear equaliser, by implementing the conventional technique for minimising the mean square error as shown in relation to FIG. 1, and by considering that the global filter $H_1$ representing the different processing operations performed corresponds to the convolution of the filters for transmission Tx 21, radio R 24 and whitening $W_1$ 52:

$$H_1(z) = Tx(z) \cdot R(z) \cdot W_1(z),$$

$$J(H_1) = E[|x(k) - y(k)|^2],$$

where $E[\bullet]$ corresponds to the mathematical expectation.

Thus, the MMSE receiving filter $Rx_1$ 41 takes into account the global filter $H_1$, and is designed so as to minimise the mean square error J.

4. Optimisation of the Coefficients of the Second Receiving Filter:

According to the preferred embodiment of the invention, once the receiving device has optimised the coefficients of the first receiver filter $Rx_1$ 41 and the adjacent detection means 43 have detected interfering signals carried in a propagation channel adjacent to the channel for propagation of the main signal, the receiving device optimises the calculation of the coefficients of the second receiving filter $Rx_2$ 42, as shown in FIG. 6A.

This receiving filter $Rx_2$ 42 is designed to optimise the performance of the receiver in the presence of adjacent interfering signals. It minimises the residual inter-symbol interference seen by the receiver and due to the filters for transmission and radio modelling R 24 and the first adjusted receiving filter $Rx_1$ 61 (the coefficients of this adjusted filter taking into account the whitening filter $W_1$ 52) while minimising the interference due to the adjacent channels.

Figure 6B:
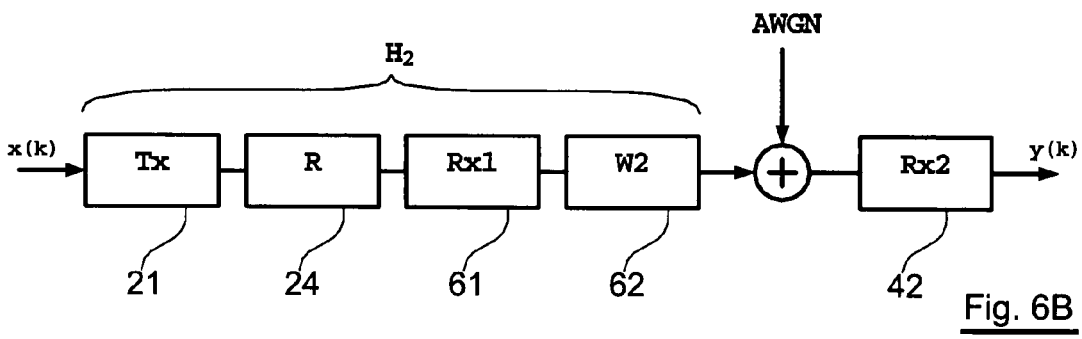

As shown in FIG. 6B and explained in relation to FIGS. 2A and 2B, a second whitening filter $W_2$ 62 is then modelled, making it possible to whiten a non-white noise (affected by the adjacent interfering signals and the different filters, in particular the adjusted receiving filter $Rx_1$ 61) at the output of the adjusted receiving filter $Rx_1$ 61, so as to calculate the coefficients of the second receiving filter $Rx_2$ 42.

To do this, the transmission channel is first modelled, taking into account:
- the filter Tx 21 for transmission of the main signal;
- the filter $J_2$ for shaping adjacent interfering signals;
- at least one channel for propagating the co-channel interfering signal of which the transfer function is modelled by the identity function;
- the radio filter R representing at least one radio processing operation applied to the main signal at the reception;
- the first filter $Rx_1$ 61.

The filter $J_2$ for shaping the interfering signals takes into account in particular the filter for transmission Tx 21 of the frequency-shifted main signal (modulated, for example, by a sinusoid at a frequency of 200 kHz), since the interfering signals are carried/transmitted in a frequency band adjacent to the frequency band of the main signal, or in a propagation channel adjacent to the channel for propagation of the main signal.

The channel model can in particular be expressed in the form of a global transfer filter $G_2$.

Next, we consider a model noise $\sigma^2$ on the coefficients of the global transfer filter $G_2$, forming a robust filter $F_2$.

This model noise $\sigma^2$ is taken into account in particular in the whitening step, in the second whitening filter $W_2$ 62, and enables the whitening of the co-channel interfering signal to be made robust with regard to the propagation channel. This model noise $\sigma^2$ also makes it possible to adjust the length of the filter $W_2$ 62, defined by the following equations:

$$W_2(z) \cdot W_2^*(1/z^*) = \frac{1}{F_2(z) \cdot F_2^*(1/z^*)} = \frac{1}{G_2(z) \cdot G_2^*(1/z^*) + \sigma^2}$$

with $G_2(z) = R(z) \cdot Rx_1(z) \cdot J_2(z)$ where
- Tx(z) is the z-transform of the transmission filter Tx 21;
- R(z) is the z-transform of the radio filter R 24;
- $J_2(z)$ is the z-transform of the transmission filter Tx 21, frequency shifted by 200 kHz;
- $\sigma^2$ is the power of the model noise, or its variance.

Thus, the second whitening filter $W_2$ 62 takes into account the noise introduced by the filter $J_2$ for shaping the interfering signals and the noise introduced by the different filters, in particular the radio filter R 24 and the adjusted receiving filter $Rx_1$ 61.

The second filter $Rx_2$ 42 is then constructed as a MMSE linear equaliser, by implementing the conventional technique for minimising the mean square error as shown in relation to FIG. 1.

However, it is considered in this case that the global filter $H_2$, representing the different processing operations performed, corresponds to the convolution of the filters for transmission Tx 21, radio R 24 and whitening $W_2$ 62:

$$H_2(z) = Tx(z) \cdot R(z) \cdot Rx_1(z) \cdot W_2(z),$$

$$J(H_2) = E[|x(k) - y(k)|^2],$$

where $E[\bullet]$ corresponds to the mathematical expectation.

Thus, the MMSE receiving filter $Rx_2$ 42 takes into account the global filter $H_2$, and is designed so as to minimise the mean square error J.

A digital example of the calculations of the coefficients of the receiving filters $Rx_1$ and $Rx_2$ is provided in the appendix.

Figure 8:
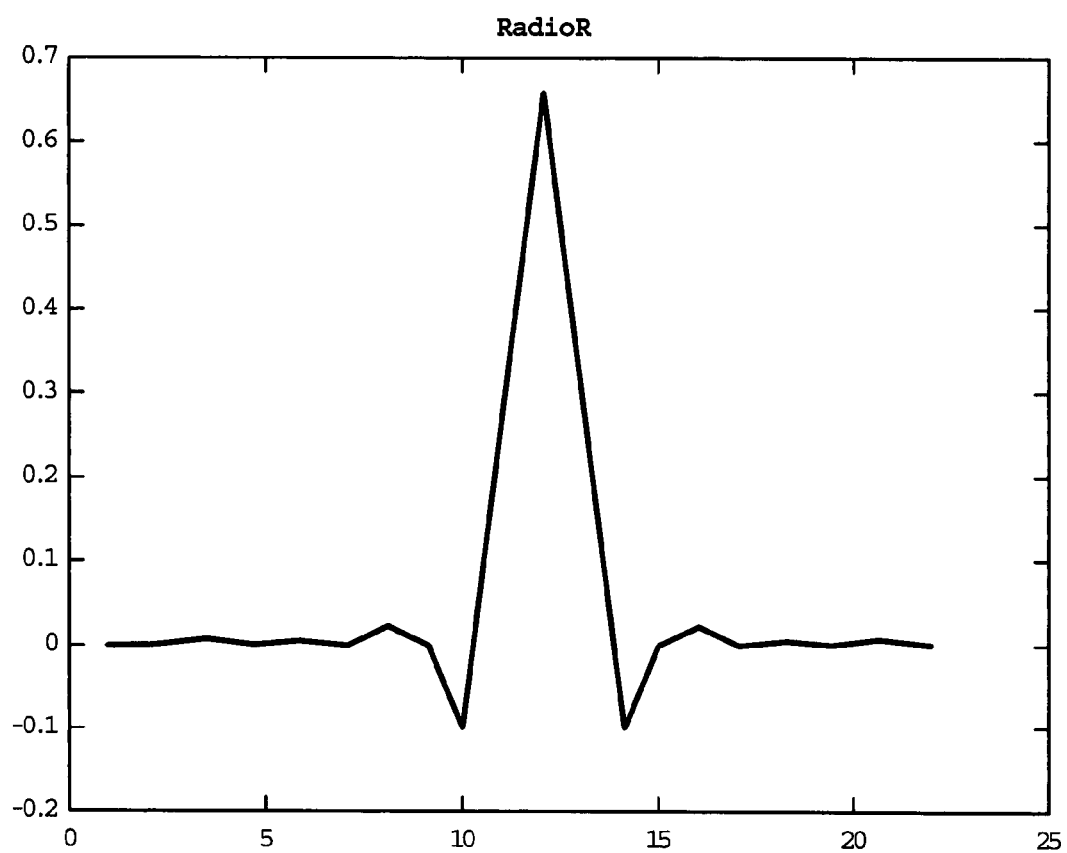
FIG. 8 shows the pulse response of a radio filter taken into account in the calculation of the receiving filters of an embodiment of the invention.

In this example, the radio filter R chosen is a raised-cosine filter of band 180 kHz, calculated on 22 coefficients, having a roll-off factor of 0.4. FIG. 8 shows the pulse response of this radio filter R.

The transmission filter Tx used in this example is the 8PSK ("Phase Shift Keying") transmission filter, as defined in the standard "GSM 05.04 Digital cellular telecommunications system (Phase 2+) Modulation".

It can be noted that in the case of a GSM/EDGE cellular network, where GMSK ("Gaussian minimum phase shift keying") and 8PSK interfering signals are possible, this same 8PSK filter Tx is used to calculate the receiving filters $Rx_1$ and $Rx_2$.

Indeed, this 8PSK filter is defined so that the two 8PSK and GMSK signals transmitted have the same spectrum.

Then, after modelling of the transmission channel, the coefficients of the whitening filters $W_1$ and $W_2$ are evaluated, and from these coefficients, the coefficients of the receiving filters $Rx_1$ and $Rx_2$ are calculated.

In the example shown, it is considered in particular for the calculation of the coefficients of filters $W_1$ and $Rx_1$ that:
- the relative power of a co-channel interfering signal ($\sigma_{co\text{-}canal}^2$) and the additive white Gaussian noise ($\sigma_1^2$) is on the order of 20 dB:

$$10\log_{10}\left(\frac{\sigma_{co\text{-}canal}^2}{\sigma_1^2}\right) = 20\text{dB};$$

- the relative power of the model noise and the co-channel interfering signals and white noise is on the order of 20 dB:

$$10\log_{10}\left(\frac{\sigma_1^2 + \sigma_{co-canal}^2}{\sigma^2}\right) = 20\text{dB};$$

- the signal-to-noise ratio for the calculation of the MMSE linear equaliser is on the order of 10 dB;

and, for the calculation of the coefficients of filters $W_2$ and $Rx_2$, that:
- the relative power of the model noise and the adjacent interfering signals ($\sigma_{adjacent}^2$) is on the order of 20 dB:

$$10\log_{10}\left(\frac{\sigma_{adjacent}^2}{\sigma^2}\right) = 20\text{dB};$$

- the signal-to-noise ratio for the calculation of the MMSE linear equaliser is on the order of 10 dB.

The coefficients of the whitening filters $W_1$ and $W_2$ and the coefficients of the receiving filters $Rx_1$ and $Rx_2$, calculated by taking into account the different parameters, are provided in the appendix.

Figure 9A:
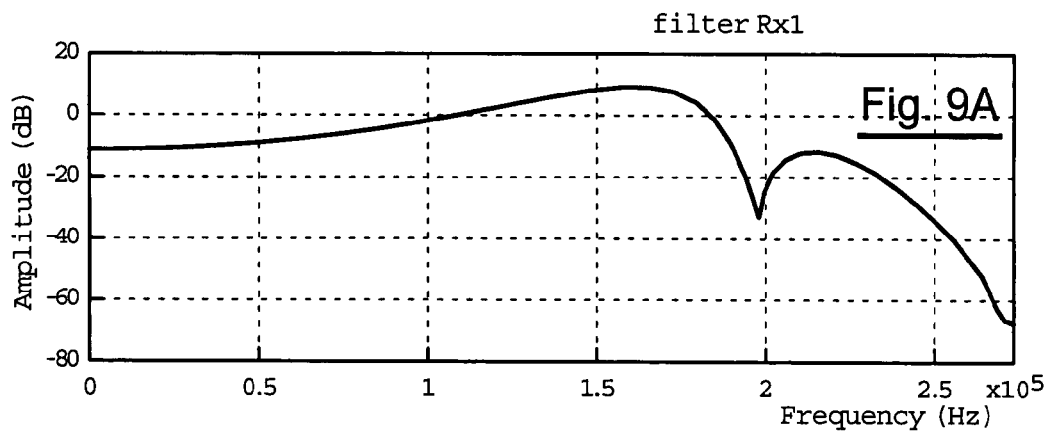
FIGS. 9A, 9B and 9C describe a first receiving filter (amplitude, phase and pulse response) implemented in a receiving device in the presence of co-channel interfering signals and thermal white noise.
Figure 9B:
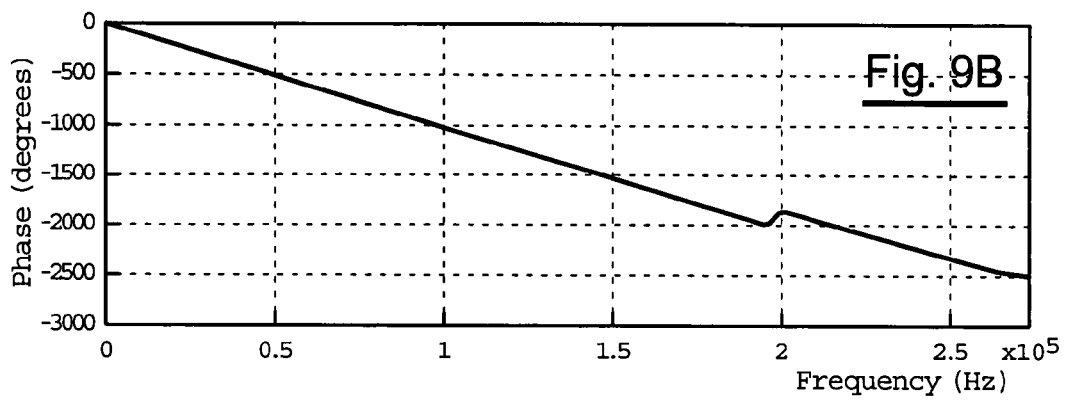
Figure 9C:
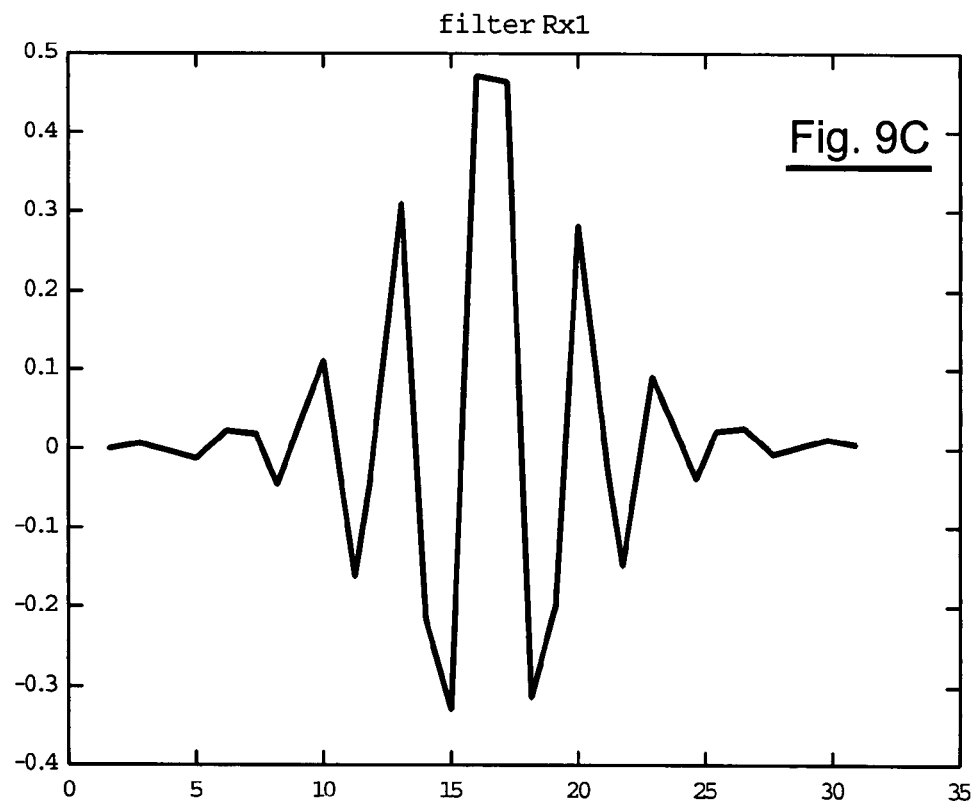

The receiving filters $Rx_1$ and $Rx_2$ evaluated in this example are presented in relation to FIGS. 9A, 9B and 9C (filter $Rx_1$), and 10A, 10B and 10C (filter $Rx_2$).

Thus, the module of the transfer function of the filter $Rx_1$ as a function of its frequency is shown in FIG. 9A, the phase of the transfer function of the filter $Rx_1$ as a function of its frequency is shown in FIG. 9B, and the pulse response of the filter $Rx_1$ is shown in FIG. 9C.

Figure 10A:
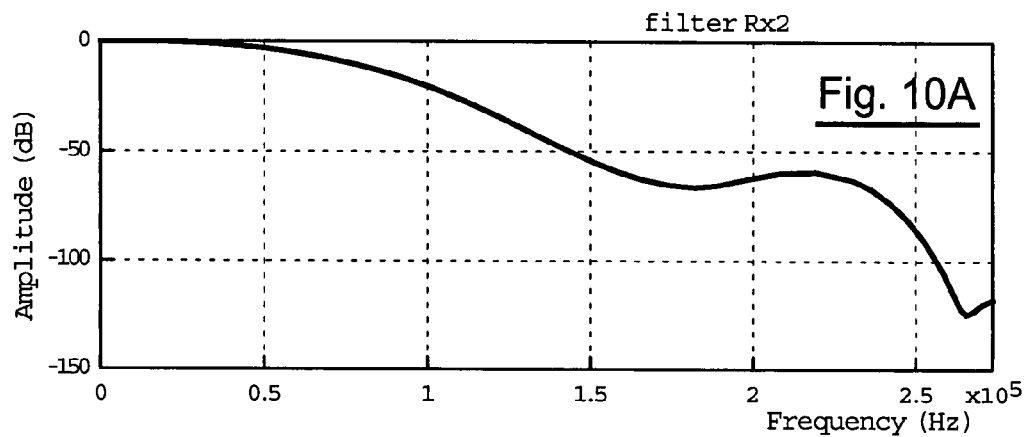
FIGS. 10A, 10B and 10C show a second receiving filter (amplitude, phase and pulse response) implemented in a receiving device in series with the first receiving filter of FIGS. 9A, 9B and 9C, in the presence of interfering signals coming from channels adjacent to the main channel.
Figure 10B:
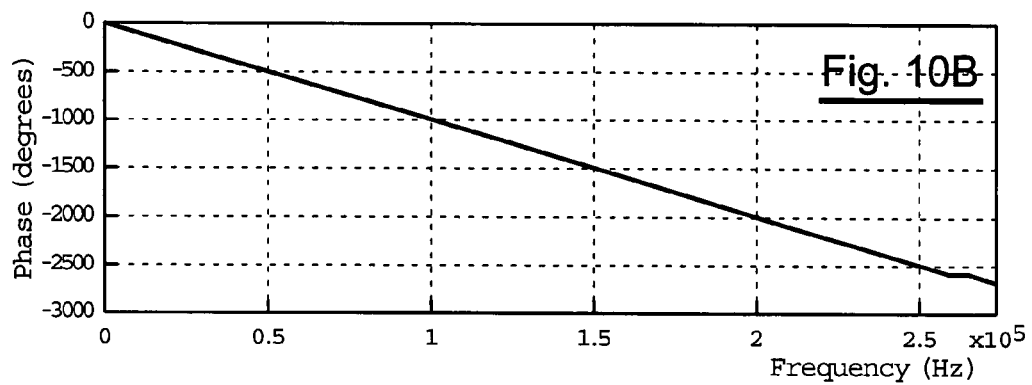
Figure 10C:
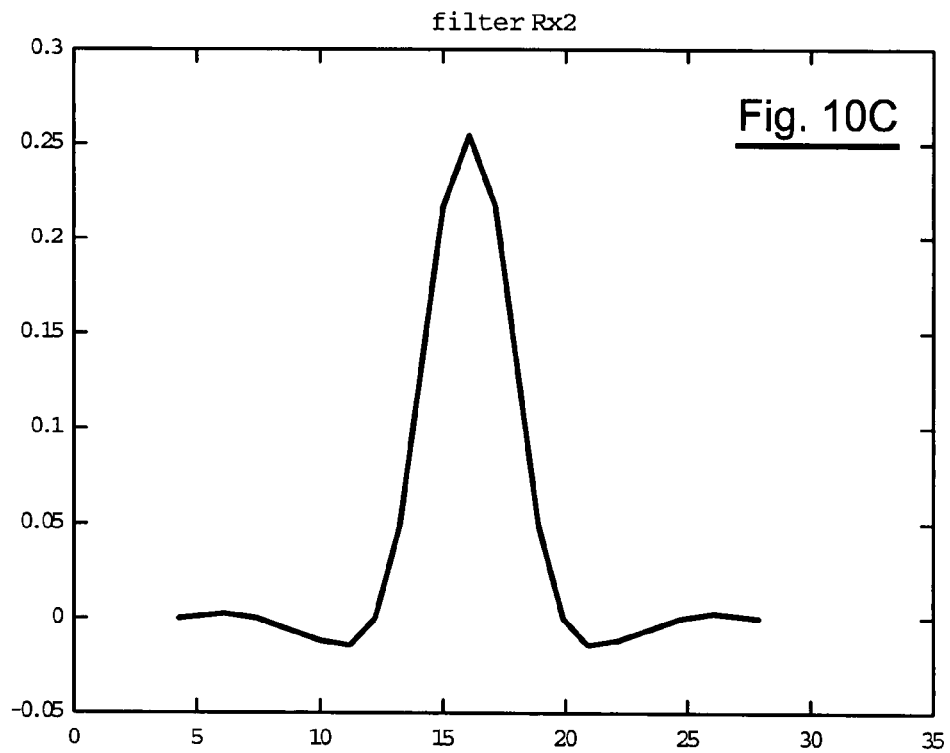

FIGS. 10A, 10B and 10C show the transfer function of the filter $Rx_2$ as a function of its frequency (FIG. 10A), the phase of the transfer function of the filter $Rx_2$ as a function of its frequency (FIG. 10B), and the pulse response of the filter $Rx_2$ (FIG. 10C).

Figure 7A:
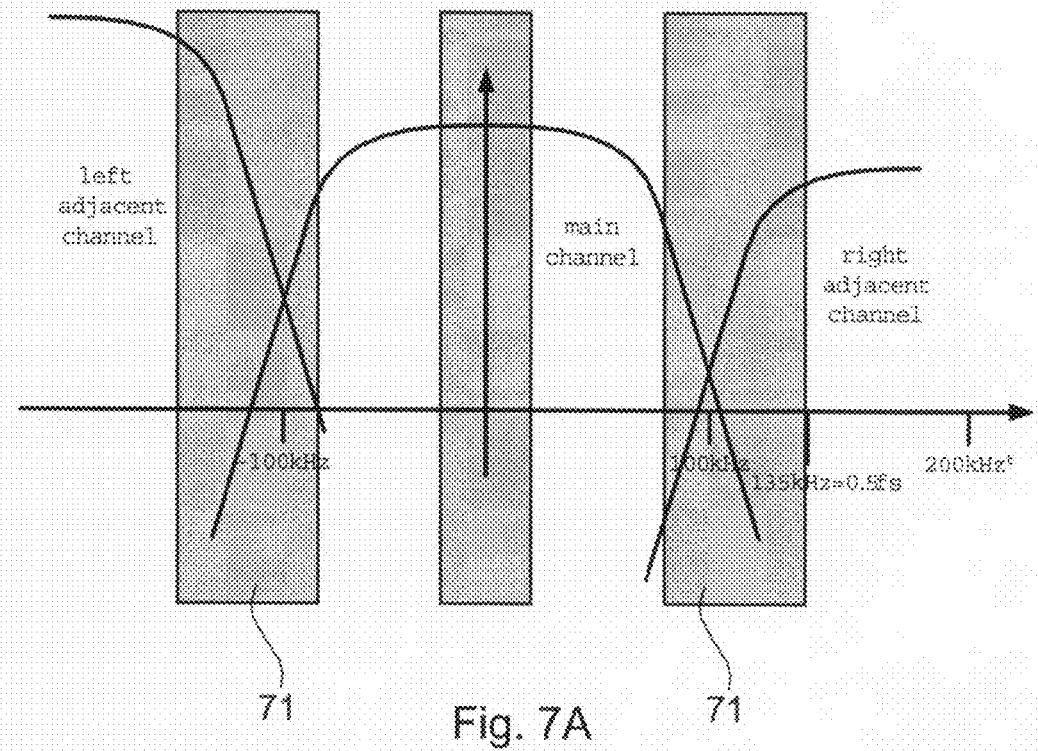
FIGS. 7A and 7B show two techniques for detecting interfering signals coming from channels adjacent to the main channel, capable of being implemented in the receiving device according to an embodiment of the invention.
Figure 7B:
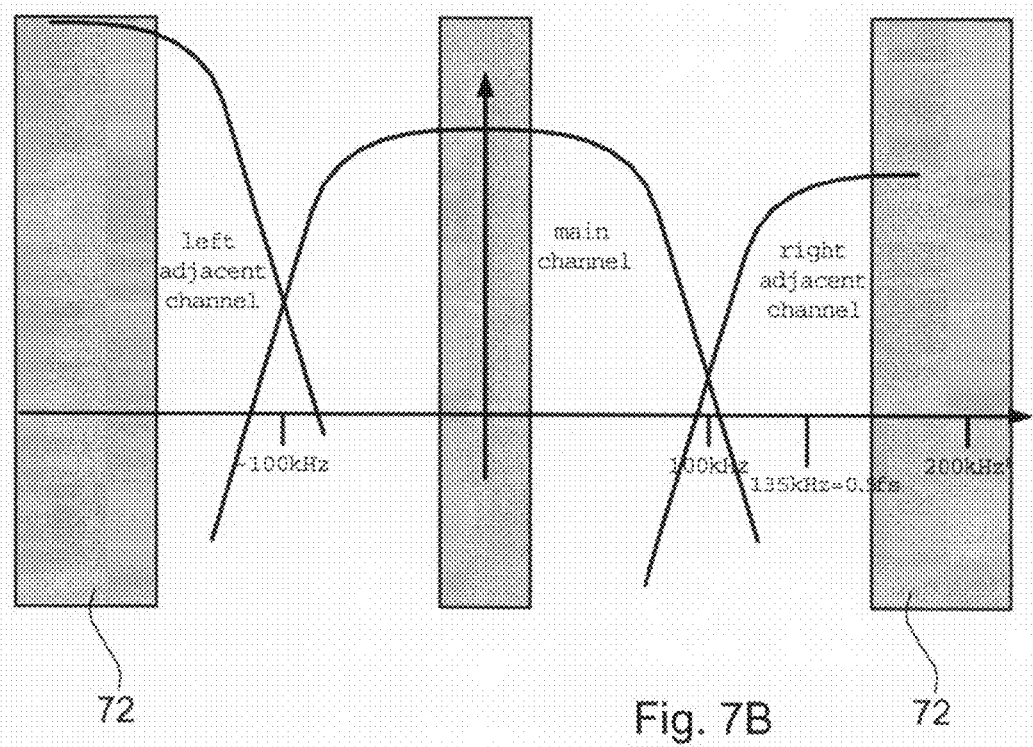

5. Implementation of the Means for Detecting Adjacent Interfering Signals:

We will now describe, in relation to FIGS. 7A and 7B, two techniques for detecting interfering signals transmitted in a frequency band adjacent to the frequency band of the main signal and capable of being implemented in a receiving device according to an embodiment of the invention.

As described above, according to the preferred embodiment of the invention, means 43 for detecting adjacent interfering signals are inserted before the second filter $Rx_2$ 42, with the receiving device performing a filtering by means of the second filter $Rx_2$ 42 only when adjacent interfering signals are detected.

These detection means 43 must thus make a decision at the level of the data bursts received, in order whether or not they are disturbed by one of the two adjacent channels (left or right) as shown in FIG. 3.

This decision can be based on the burst received, but also on a statistic taking into account the results of the current burst, coupled with those of the preceding bursts.

This hard decision can optionally be accompanied by a reliability indicator of the probability of said signal being disturbed or not by an adjacent channel.

Below are various techniques making it possible to distinguish the adjacent interfering signals of the co-channel interfering signals and/or thermal white noise.

These various techniques make it possible, on the one hand, to measure the impact of each interfering signal on the current burst, and, on the other hand, to perform statistics on the last bursts, in order to obtain a final decision on the current burst.

A number of techniques can be envisaged in order to characterise the various interfering signals.

Thus, if we are seeking solely to detect an adjacent channel, it is possible to envisage a mathematical Fourier transform operation (FFT) on the several points that correspond to an area of coverage 71 of the adjacent and main channels, as shown in FIG. 7A.

This first technique can be used in particular if the signal received is sampled at the symbol frequency (for example, at a frequency of 270.8 kHz in a GSM/GPRS/EDGE radio communication system), with the spectrum of the sampled signal then not containing the rest of the adjacent channels.

It is then possible to perform statistics on the energy present in this band of the signal, for example its relationship with the power of the main channel or the signal received. To obtain satisfactory results, it is possible to smooth these statistics out over a certain number of bursts received.

It is also possible to perform the Fourier transform operation (FFT) on several points in the band of adjacent channels (to the left and to the right), if it is present in the baseband spectrum.

Similarly, statistics are then performed on the energy of this signal with respect to the signal of the main channel. It is also possible to smooth these statistics out over a plurality of bursts in order to improve their reliability.

FIG. 7B thus shows another example of areas 72 where the points of the FFT to be calculated may be located.

It is noted that it is also possible to perform a Fourier transform on the entire spectrum of useful and adjacent signals. However, this technique increases the calculation time and the complexity of the system.

A second technique for detecting adjacent interfering signals consists of using a band-pass or a high-pass filter to isolate the adjacent channels.

Once these channels have been isolated, it is possible to calculate their power, their relationship to the power of the main channel, and again to perform statistics on these values.

These first two techniques seek to isolate the adjacent channel(s) by distinguishing it (them) from the main channel in the frequency domain.

Other techniques can also be used, isolating the interfering signals in the time domain, then processing them in the time domain or in the frequency domain.

Thus, a third technique for detecting an adjacent interfering signal consists of subtracting, from the signal received, a reconstruction of this same signal.

Let us consider for example a learning sequence known from the receiver corresponding to a portion of a data burst (i.e. the receiver knows the symbols composing the learning sequence).

A channel estimation is performed on the basis of the learning sequence. It is then possible to reconstruct the packet (or burst) received by convoluting the theoretical symbols with the estimated channel.

Then, the sequence received is subtracted from the reconstructed sequence: a time noise vector is obtained, which can be put in the frequency domain (using a FFT, for example) to obtain its spectrum.

This frequency noise vector is then correlated with pre-calculated models corresponding to the various interfering signals: white noise, co-channel, left and right adjacent signals.

A plurality of scores is then obtained, which scores are taken into account by a decision logic block, which, once again, can calculate statistics on a plurality of bursts, and transmit a final decision.

A fourth technique consists of calculating the correlation of the time noise vector obtained as described above, then comparing this correlation with pre-calculated correlation models that correspond to co-channel interfering signals, white noise, and adjacent signals.

The results of these comparisons are taken into account by a decision component, possibly on a plurality of bursts (statistics).

It is desirable to construct a low-complexity receiving filter, in a cellular radio communication system, that at least partially eliminates the interfering signals due to other users, while performing well.

More specifically, an objective is to provide a technique for designing a receiving filter that performs well even in the presence of interfering signals. In particular, an objective is to propose such a technique that makes it possible to reduce, at the reception, the negative effect of both the inter-symbol interference and the inter-user interference.

Another objective is to provide such a design technique that is simple and effective, and that makes it possible to design a robust receiving filter, suitable for the GSM/GPRS/EDGE baseband.

A resulting objective is to provide a technique for robust reception with respect to the channel for propagation of an interfering signal, i.e. having good performance even when the propagation channel of interfering signals varies.

Another objective is to propose a receiving technique of reduced complexity with respect to the solutions of the prior art, in the presence of interfering signals.

Although the present disclosure has been described with reference to various embodiments, workers skilled in the art will recognize that changes may be made in form and detail without departing from the spirit and scope of the invention.

APPENDICES

Digital example of coefficients for receiving filters $Rx_1$ and $Rx_2$, determined from the coefficients of whitening filters $W_1$ and $W_2$, from a radio filter R modelled as follows, and from a transmission filter Tx of the 8PSK type, as defined in the standard "GSM 05.04 Digital cellular telecommunications system (Phase 2+) Modulation":

Coefficients of the Radio Filter R Used:
R=[−0.00069476397561    0.00049866279829
0.00003769112140    0.00179376509986
−0.00285785891354    0.00007817157433
−0.00456346046181    0.01954632518802
−0.00128250958812    −0.10384363206460
0.25905109587175 0.66420664206642 0.25905109587175
−0.10384363206460    −0.00128250958812
0.01954632518802    −0.00456346046181
0.00007817157433    −0.00285785891354
0.00179376509986 0.00003769112140 0.00049866279829]

Coefficients of the First Modelled Whitening Filter $W_1$:
$W_1$=[1.00000000000000    −1.69923672623924
1.20422941893564    −0.15529008675767
−0.41045389212838    0.25120716271039
0.10549692072460    −0.18350163753085
0.02055990726447    0.09753248621175
−0.05745073127702    −0.03091626283764
0.04949634371071    −0.00575571431264
−0.02678700887691    0.01672974682172
0.00760788713748    −0.01367684082893
0.00225936999941    0.00696773190215
−0.00476443487796    −0.00177653929037
0.00369228207706    −0.00076552572359
−0.00180803688416    0.00134280509131
0.00040890403254    −0.00099571529204
0.00024802068919    0.00046716002803
−0.00037668966993    −0.00009103863618
0.00026770665567    −0.00007788853728
−0.00012007431632    0.00010518584002
0.00001928139743    −0.00007173063283
0.00002389439010    0.00003068453654
−0.00002924081816    −0.00000376524639
0.00001915553670    −0.00000719991206
−0.00000779095111    0.00000809486615
0.00000062554829    −0.00000509745528
0.00000213922649    0.00000196236357
−0.00000223172118    −0.00000006095299
0.00000134918087    −0.00000062991066
−0.00000048444470    0.00000061141509
−0.00000002112176    −0.00000034651382
0.00000019163480    0.00000009420485
−0.00000016222012 0.000000066609688]

Coefficients of the First Determined Receiving Filter $Rx_1$:
$Rx_1$=[−0.00012130947281    −0.00042290824165
0.00257605424211    −0.00108917050508
−0.00996742210872    0.01555037274041
0.01400103804618    −0.05971274419478
0.03014043470086    0.10472670860755
−0.17248397669623    −0.02236877457659
0.31030339312762    −0.21544655632118
−0.33138809534359    0.46952753670838
0.46493919583532    −0.32191690721434
−0.20498399405536    0.28922928740778
−0.02053484645060    −0.15319713486050
0.09062332115789    0.02497809992243
−0.04793670562384    0.01080663561778
0.01111651840583    −0.00661968318690
−0.00060765382772    0.00117508511605
−0.00011138451730]

Coefficients of the Second Modelled Whitening Filter $W_2$:
$W_2$=[1.00000000000000    0.07746136827150
1.52870558246248    −0.12663989283937
0.59100460911810    −0.02177039464291
−0.25447117057856    0.13423518075783
−0.17799535572748    −0.03587809251668
0.11101008625324    −0.08323333144596
0.03015388260085    0.06456340307543
−0.07992567542338    0.03688375728235
0.02917806396597    −0.07572161275519
0.06140602631322    −0.00666791918806
−0.05043120066762    0.07103675734251
−0.04209604339230    −0.01183625323311
0.05381374757059    −0.05706247988723
0.02274919674245    0.02276408206344
−0.04879343177558    0.04023050508713
−0.00630273368986    −0.02798624031725
0.04013298243862    −0.02453778350388
−0.00549782191719    0.02859598148265
−0.03029587878045    0.01181881230602
0.01243030237018    −0.02583059443314
0.02075460322748    −0.00260040678944
−0.01523953721570    0.02109593010211
−0.01249433519468    −0.00325983125320
0.01508637926663    −0.01575076423646
0.00615174446830    0.00621578325591
−0.01322463047943    0.01095547189688
−0.00211089715217    −0.00675265797766
0.01087722095869    −0.00755246669693
0.00083230441047    0.00478441597740
−0.00934017592739    0.00502209882898
−0.00547012373567]

Coefficients of the Second Determined Receiving Filter $Rx_1$:
$Rx_2$=[−0.00000426432980    −0.00002687976707
−0.00002682337906    0.00010604881319
0.00054407749055 0.00126084040857 0.00130239319269
−0.00090752283816    −0.00709465605356
−0.01569043823635    −0.01793035849060
0.00126528463586 0.05560738033813 0.13918970304906
0.21942698798309 0.25276417496279 0.21777830984067
0.13687299502456 0.05370799483963 0.00028109355284
−0.01815007990869    −0.01557104426546
−0.00691557806640    −0.00081780292270
0.00128887097528 0.00121844377595 0.00049998932091
0.00008291350184    −0.00003108725373
−0.00002712220642 −0.00000384398762]

The invention claimed is:

1. Method for designing a digital reception filter for a main signal, the method comprising:
   modelling at least one channel for transmission of at least one signal interfering with said main signal, so as to obtain an interfering channel model;
   whitening of said at least one interfering signal, by a whitening filter taking into account said interfering channel model and a noise on said model, referred to as a model noise;
   calculating coefficients of said digital reception filter on the basis of at least one coefficient of said whitening filter;

wherein, if said interfering signal is transmitted in a desired frequency band, called a co-channel interfering signal, said whitening filter, called the whitening filter $W_1$, verifies the equation:

$$W_1(z) \cdot W_1^*(1/z^*) = \frac{1}{G_1(z) \cdot G_1^*(1/z^*) + \sigma^2}$$

with $G_1(z) = R(z) \cdot J_1(z)$, and $J_1(z) = Tx(z) + \sigma_1$ and, if said interfering signal is transmitted in a frequency band different from said desired frequency band, called an adjacent interfering signal, said whitening filter, called the second whitening filter $W_2$, verifies the equation:

$$W_2(z) \cdot W_2^*(1/z^*) = \frac{1}{G_2(z) \cdot G_2^*(1/z^*) + \sigma^2}$$

with $G_2(z) = R(z) \cdot Rx_1(z) \cdot J_2(z)$, where
$\sigma^2$ is the power of said model noise;
$\sigma_1^2$ is the power of a thermal white noise;
Tx(z) is the z-transform of a transmission filter Tx;
R(z) is the z-transform of a radio filter R;
$Rx_1(z)$ is the z-transform of a first filter $Rx_1$;
$J_2(z)$ is the z-transform of a frequency-shifted transmission filter.

2. Design method according to claim 1, and further comprising parameterizing the complexity of said digital reception filter by said model noise.

3. Design method according to claim 1, wherein said whitening filter comprises a minimum-phase filter.

4. Design method according to claim 1, wherein said modelling step takes into account:
at least one filter for transmission of said main signal and/or said at least one interfering signal;
at least one channel for propagation of said interfering signal of which the transfer function is modelled by the identity function;
at least one filter representing at least one radio processing operation applied to said main signal at reception of said main signal, called a radio filter.

5. Device for receiving a main signal transmitted in a desired frequency band, the device comprising:
a series filtering architecture making it possible to at least partially eliminate contribution of at least one disturbance affecting said main signal, including:
at least one first filter suitable for the disturbances belonging to the group consisting of:
at least one interfering signal transmitted in said desired frequency band, called a co-channel interfering signal; and
at least one thermal white noise; and
at least one second filter suitable for at least one interfering signal transmitted in a frequency band different from said desired frequency band, called an adjacent interfering signal,
coefficients of at least one of said first and second filters are a function of coefficients of a filter for whitening at least one co-channel and/or adjacent interfering signal, said whitening filter taking into account a noise on a model of a channel for transmission of said interfering signal, called model noise, said filter for whitening at least one co-channel interfering signal, called the first whitening filter $W_1$, verifying the equation:

$$W_1(z) \cdot W_1^*(1/z^*) = \frac{1}{G_1(z) \cdot G_1^*(1/z^*) + \sigma^2}$$

with $G_1(z) = R(z) \cdot J_1(z)$, and $J_1(z) = Tx(z) + \sigma_1$ and said filter for whitening at least one adjacent interfering signal, called the second whitening filter $W_2$, verifying the equation:

$$W_2(z) \cdot W_2^*(1/z^*) = \frac{1}{G_2(z) \cdot G_2^*(1/z^*) + \sigma^2}$$

with $G_2(z) = R(z) \cdot Rx_1(z) \cdot J_2(z)$, where
$\sigma^2$ is the power of said model noise;
$\sigma_1^2$ is the power of a thermal white noise;
Tx(z) is the z-transform of a transmission filter Tx;
R(z) is the z-transform of a radio filter R;
$Rx_1(z)$ is the z-transform of the first filter $Rx_1$;
$J_2(z)$ is the z-transform of a frequency-shifted transmission filter.

6. Receiving device according to claim 5, and further comprising a detector to detect at least one adjacent interfering signal determining the activation of said second filter.

7. Receiving device according to claim 5, wherein the device is linear and of the MMSE type ("Minimum Mean Square Error").

8. Receiving device according to claim 5, wherein coefficients of at least one of said first and second filters are a function of coefficients of a filter for whitening at least one co-channel and/or adjacent interfering signal, said whitening filter taking into account a noise on a model of a channel for transmission of said interfering signal, called model noise.

9. Receiving device according to claim 8, wherein, for the first filter, said transmission channel model takes into account:
a filter for transmission of said main signal and/or said at least one co-channel interfering signal;
at least one channel for propagation of said co-channel interfering signal of which the transfer function is modelled by the identity function;
at least one filter representing at least one radio processing operation applied to said main signal at reception of said main signal, called a radio filter.

10. Receiving device according to claim 8 wherein, for said second filter, the transmission channel model takes into account:
a filter for transmission of said main signal;
at least one filter for transmission of said adjacent interfering signals;
at least one channel for propagation of said adjacent interfering signals of which the transfer function is modelled by the identity function;
at least one filter representing at least one radio processing operation applied to said main signal at reception of said main signal, called a radio filter;
said first filter.

* * * * *